United States Patent [19]
Irwin

[11] 3,765,492
[45] Oct. 16, 1973

[54] EARTH WORKING IMPLEMENT WITH TRIPPING MECHANISM

[75] Inventor: Gordon A. Irwin, Cooperstown, N. Dak.

[73] Assignee: Clark Equipment Company, Buchanan, Mich.

[22] Filed: Mar. 22, 1971

[21] Appl. No.: 126,759

[52] U.S. Cl. .............................................. 172/266
[51] Int. Cl. ............................................. A01b 61/00
[58] Field of Search .................... 192/261, 263–269, 192/776, 657, 658, 763, 705

[56] References Cited
UNITED STATES PATENTS

| | | | |
|---|---|---|---|
| 1,073,361 | 9/1913 | Paul | 172/657 X |
| 3,202,223 | 8/1965 | Fulton | 172/264 |
| 3,483,930 | 12/1969 | Detwiller et al. | 172/266 X |
| 3,481,407 | 12/1969 | Arnold et al. | 172/265 UX |
| 1,164,390 | 12/1915 | Paul | 172/657 |

Primary Examiner—Edgar S. Burr
Assistant Examiner—Stephen C. Pellegrino
Attorney—Kenneth C. Witt, John C. Wiessler, Robert H. Johnson and Lewis J. Lamm

[57] ABSTRACT

A tractor drawn multiple bottom trip beam moldboard plow having a diagonally extending main frame member. A plurality of trip beams are pivotally connected to the frame member. Each trip beam has an inverted generally U-shaped portion, the bight portion thereof being disposed above the frame member, and a bifurcated portion, the legs thereof being pivotally connected to the frame adjacent opposite sides of the frame member.

9 Claims, 5 Drawing Figures

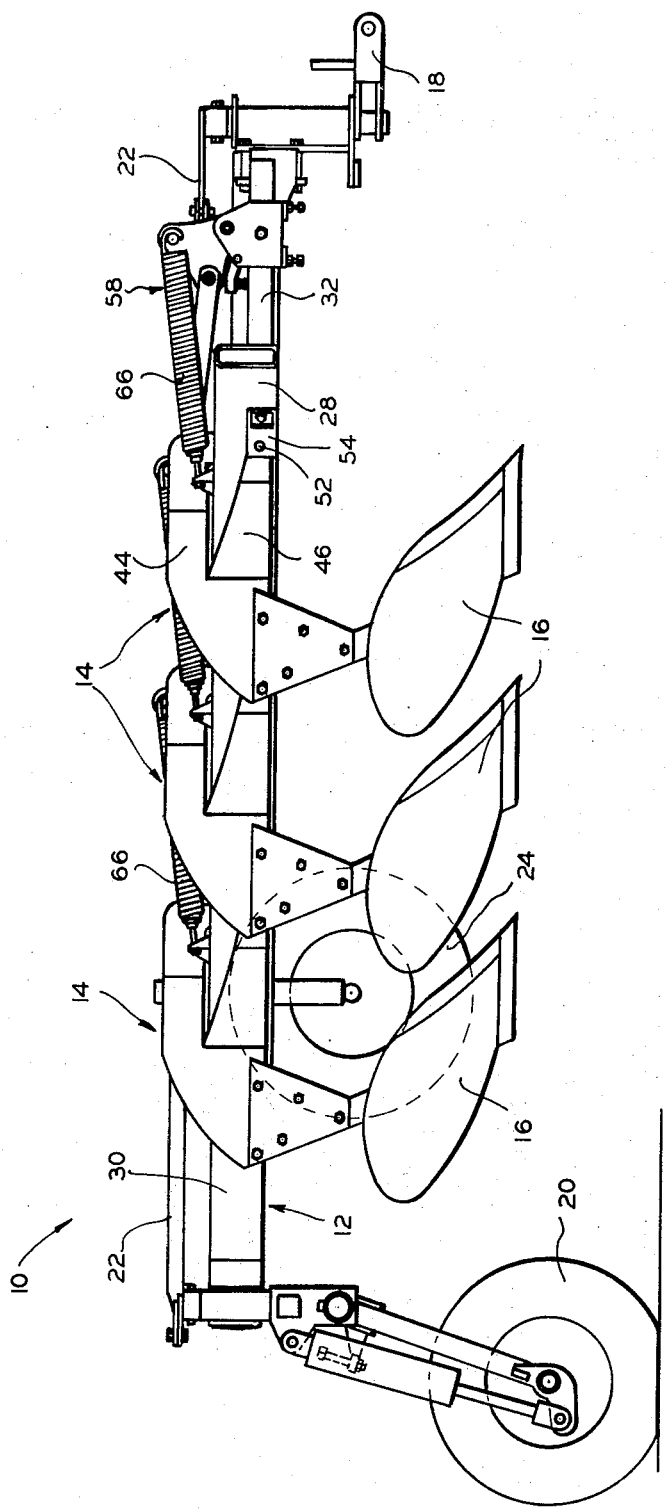

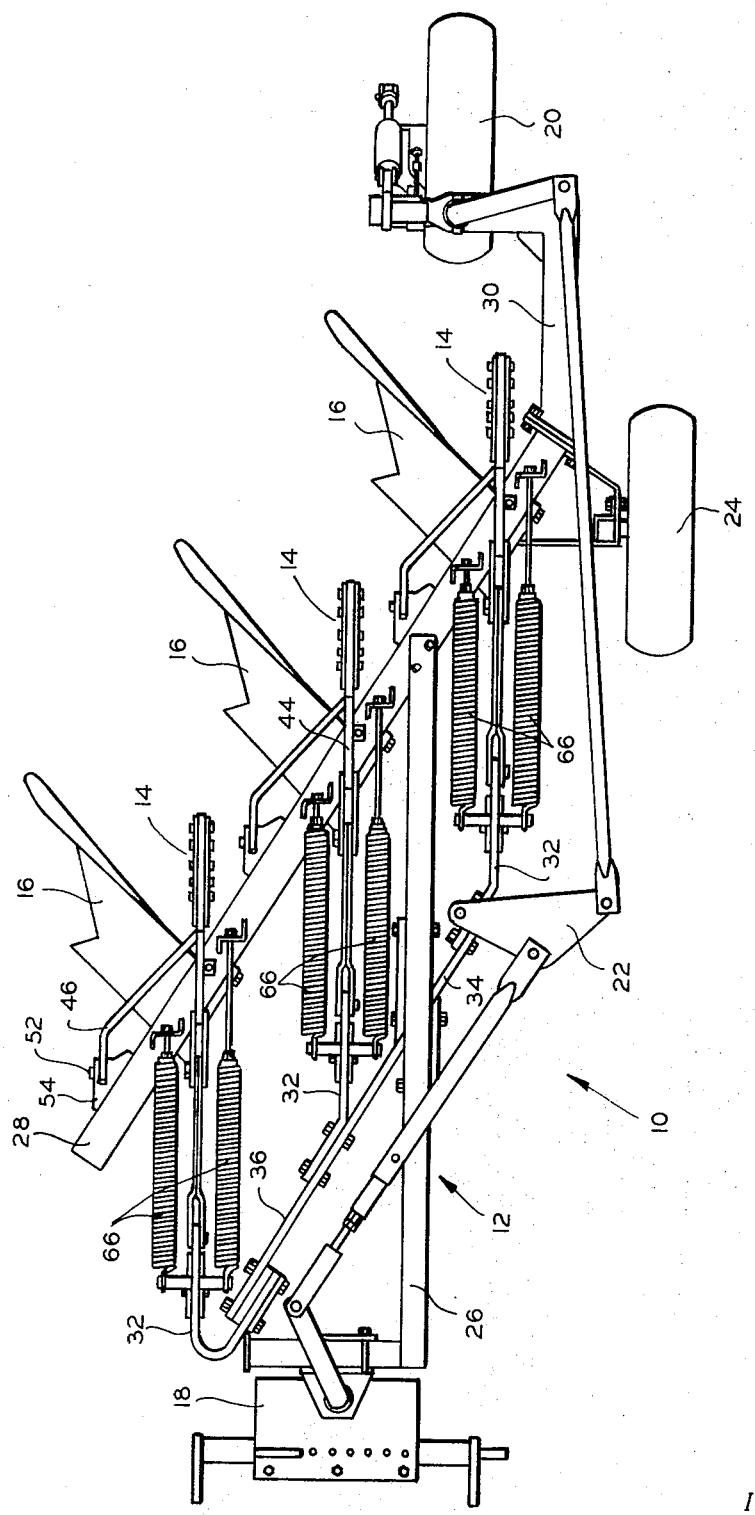

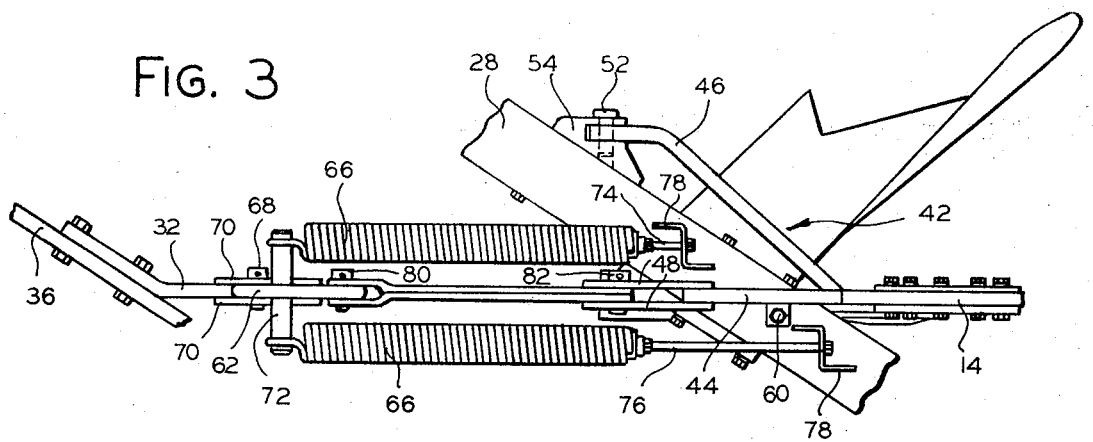
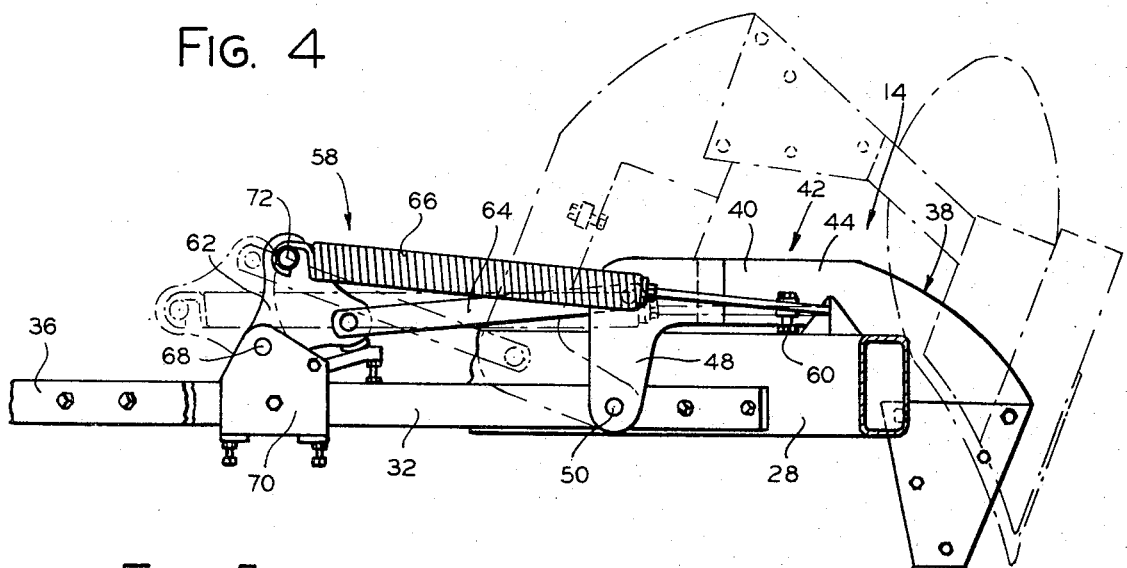
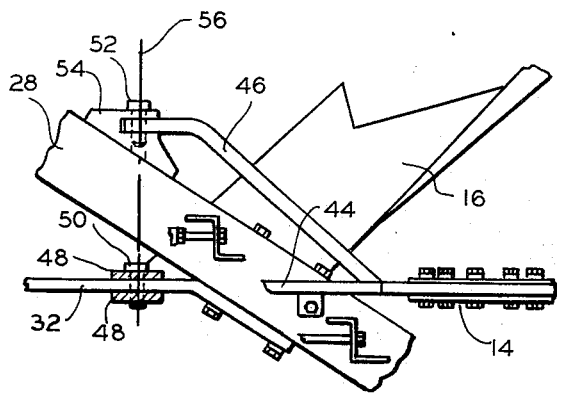

EARTH WORKING IMPLEMENT WITH TRIPPING MECHANISM

BACKGROUND OF THE INVENTION

The field of art to which this invention relates includes earth working implements having overload tripping mechanism.

When an earth working tool of an earth working implement encounters an obstruction it is desirable that the tool release and then reset after passing the obstruction in order ot prevent damage to the implement. Earth working implements which function in this manner are disclosed in U. S. Pat. Nos. 3,468,382 and 3,483,930. Such arrangements, especially the trip beams and the structural connections between the trip beams and the diagonal support member are subjected to substantial stresses due to the lateral forces caused when the earth working tool is a moldboard plowshare, for example. Consequently, it is an object of my invention to provide a trip beam earth working implement which is better able to accept stresses due to laterally imposed forces.

SUMMARY OF THE INVENTION

In carrying out my invention in a preferred embodiment, I provide a frame having a diagonal main frame member and at least one trip beam adapted to have an earth working tool attached thereto. Each trip beam has an inverted generally U-shaped portion with the bight portion thereof disposed above the frame member. Each trip beam also has a bifurcated portion with the legs pivotally connected to the frame adjacent opposite sides of the frame member.

The above and other objects, features and advantages of my invention will be more readily understood by persons skilled in the art when the detailed description is taken in conjunction with the drawing.

BRIEF DESCRIPTION OF THE DRAWING

FIG. 1 is a side elevation of an earth working implement embodying my invention, FIG. 2 is a plan view of the implement shown in FIG. 1, FIG. 3 is an enlarged fragmentary plan view of a single trip beam assembly, FIG. 4 is a side elevation of the assembly shown in FIG. 3, and FIG. 5 is a fragmentary view with parts of the trip beam assembly removed to show the pivotal connections of the trip beam to the frame.

DESCRIPTION OF THE PREFERRED EMBODIMENT

Referring to FIGS. 1 and 2, reference numeral 10 denotes generally an earth working implement, and more specifically a semi-mounted multiple bottom moldboard plow. Plow 10 includes a frame 12 to which a plurality of trip beams 14 are connected and to each of which a moldboard plowshare 16 is connected.

Frame 12 includes a hitch 18 which is adapted to be connected to a tractor and a retractible dirigible tail wheel 20 which assists in supporting and steering plow 10 and which is connected to hitch 18 by steering linkage 22. Also connected to frame 12 is a gauge wheel 24 which serves to maintain a constant plowing depth.

Frame 12 includes a longitudinally extending main frame member 26 which is connected to hitch 18 and a diagonally extending main frame member 28 which is connected to frame member 26. Both main frame members 26 and 28 preferably are tubes having a rectangular cross-section. Connected to diagonal frame member 28 is another frame member 30 to which tail wheel 20 is connected for pivotal movement. Frame 12 also includes a plurality of generally longitudinally extending bars 32 which correspond in number to trip beams 14. Each bar 32 is connected at one end to diagonal main frame member 28. The other ends of bars 32 are connected to longitudinal main frame member 26 by means of bars 34 or 36 which serve to stabilize the forward ends of bars 32.

Referring now also to FIGS. 3, 4 and 5, each trip beam 14 includes an inverted generally U-shaped portion 38, the bight portion 40 of which overlies diagonal main frame member 28. Trip beam 14 also includes a bifurcated portion 42 which includes a leg 44 and another leg 46. The forward end of leg 44 includes a pair of spaced apart plates 48. Leg 44 is pivotally connected to frame 12 adjacent one side of diagonal main frame member 28 by a pin 50 which passes through plates 48 and bar 32. Leg 46 is pivotally connected to frame 12 adjacent the other side of diagonal main frame member 28 by means of a pin 52 which is carried by a bracket 54 which is connected to main frame member 28. Because of the pivotal connection of legs 44 and 46 to frame 12 trip beam 14 is movable between a working position, as shown in FIG. 4 in solid lines, and a raised position, as shown in dotted outline in FIG. 4. Trip beam 14 is actuated to its raised position when moldboard plowshare 16 encounters an obstruction during plowing. After plow 10 has passed the obstruction, then trip beam 14 will return to the working position shown in solid outline.

At this point it will be noted that the pivotal connections of legs 44 and 46 to frame 12 are relatively widely spaced apart and located on each side of diagonal main frame member 28. Furthermore, the axes of the pivotal connections, as indicated by centerline 56, pass through diagonal main frame member 28. All of this contributes to a construction which is better able to absorb the stresses due to lateral forces when a moldboard plowshare is being used, for example.

Trip beam 14 is biased to its working position by means of mechanism 58 which generally tends to maintain an adjustable stop 60 on trip beam 14 in abutment with the top of diagonal main frame member 28. Mechanism 58 includes a bellcrank 62, a link 64 and a pair of tension springs 66. Bellcrank 62 is pivotally connected to bar 32 of frame 12 by means of a pin 68 which passes through a pair of plates 70 which are connected to bar 32. Extending transversely from bellcrank 62 is a rod 72 to which one end of each spring 66 is connected. The other end of springs 66 is anchored to diagonal main frame member 28 by means of connecting rods 74 and 76 which pass through brackets 78 that are attached to the top of frame member 28. Link 64 is pivotally connected to bellcrank 62 by a pin 80 and is pivotally connected to trip beam 14 by a pin 82 which passes through plates 48 of leg 44. Mechanism 58 is fully described and claimed in U. S. Pat. No. 3,483,930 mentioned hereinabove.

While only a single embodiment of my invention has been described in detail, it will be understood that this description is intended to be illustrative only and that various modifications and changes can be made to my invention without departing from the spirit and scope of it. Therefore, the limits of my invention should be determined from the following appended claims.

I claim:

1. An earth working implement comprising a frame, said frame including a diagonally extending main frame member and a trip beam adapted to have an earth working tool attached thereto, said trip beam having a body with a downwardly extending rear leg portion behind the main frame member on which said earth working tool is mounted, a bight portion extending forwardly from the rear leg portion disposed above said main frame member and a pair of leg portions, one projecting downwardly from said bight portion in front of the main frame member being pivotally connected adjacent one side thereof and the other leg portion projecting forwardly and laterally from said rear leg portion being pivotally connected adjacent the other side of said main frame member, said pair of leg portions spaced sufficiently apart to resist lateral forces acting on said tool in the working position and pivoting vertically relative to the main frame member when said tool encounters an obstruction and a resilient means on said frame for biasing said trip beam to its working position.

2. An implement as set forth in claim 1 wherein the axes of said pivotal connections are substantially coaxial and pass through said main frame member.

3. An implement as set forth in claim 1 wherein said frame includes a generally longitudinally extending bar connected to said main frame member, said one leg being pivotally connected to said bar.

4. An implement as set forth in claim 3 wherein the axes of said pivotal connections are substantially coaxial and pass through said main frame member.

5. An implement as set forth in claim 2 including means connected to said trip beam and frame for resiliently biasing said trip beam to said working position.

6. An implement as set forth in claim 3 including means connected to said trip beam and frame for resiliently biasing said trip beam to said working position.

7. An implement as set forth in claim 6 wherein said biasing means includes a bellcrank pivotally connected to and disposed above said bar, a link pivotally connected to said bellcrank and trip beam and resilient means connected to said bellcrank and frame.

8. An earth working implement comprising a frame, said frame including a longitudinal main frame member, a diagonal main frame member connected to said longitudinal main frame member, a plurality of laterally spaced apart and longitudinally extending bars, said bars being connected at one end to said diagonal main frame member, and means connected to said longitudinal main frame member and the other end of said bars for stabilizing said bars, a plurality of trip beams adapted to have an earth working tool attached to each one, each of said trip beams having an inverted generally U-shaped portion with the bight portion thereof disposed above said diagonal main frame member, each of said trip beams also having a bifurcated portion, one leg of said bifurcated portion being pivotally connected to said diagonal main frame member adjacent one side thereof and the other leg of said bifurcated portion being pivotally connected to one of said bars adjacent the other side of said diagonal main frame member so that each of said trip beams is pivotal between a working position and a raised position, and a plurality of resilient means on said frame for biasing said trip beams to their working position.

9. An implement as set forth in claim 8 wherein each of said biasing means is disposed above said frame whether the associated trip beam is in the working or raised position.

* * * * *